UNITED STATES PATENT OFFICE.

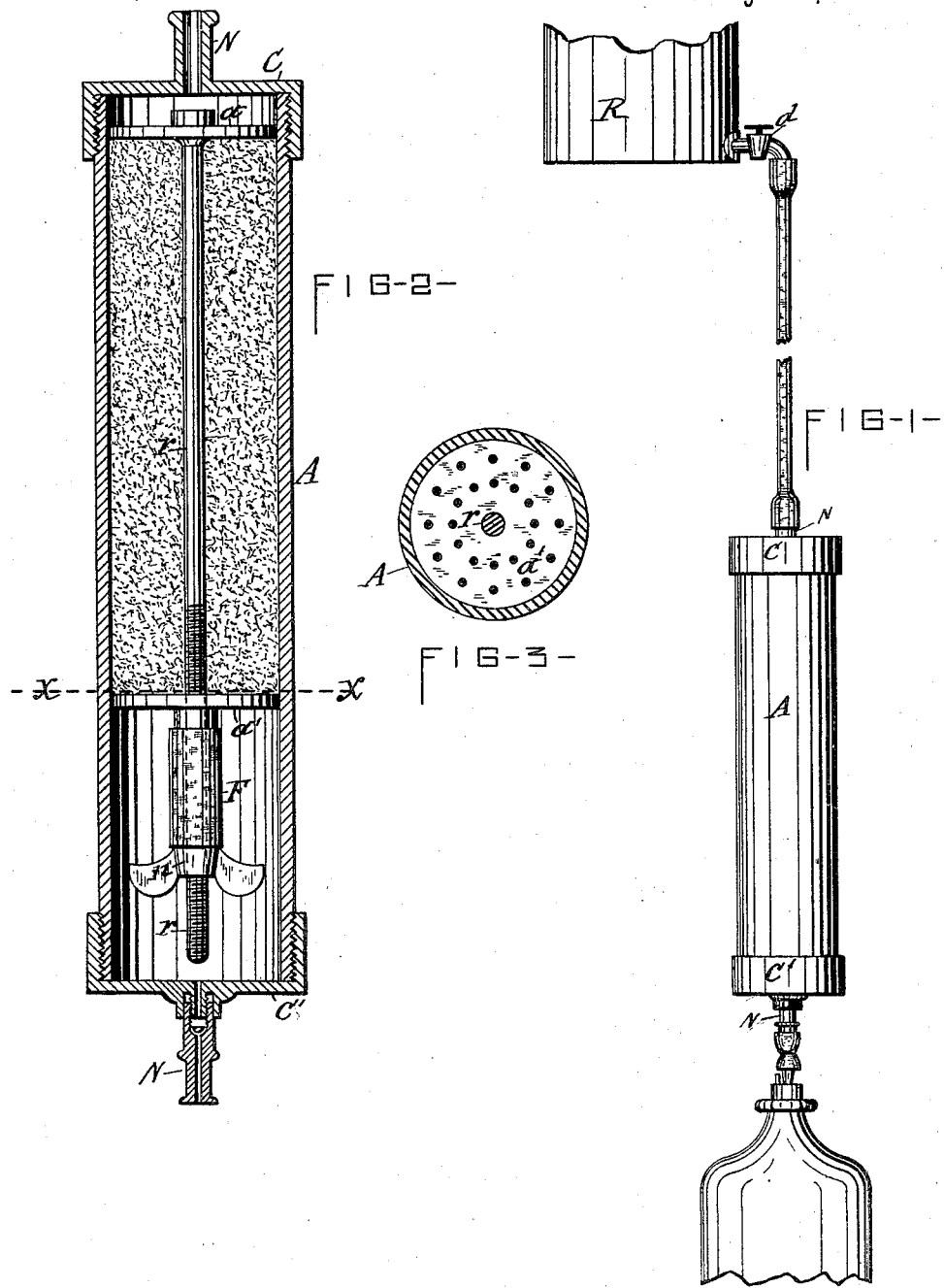

WALLACE SUITS, OF CANASTOTA, NEW YORK, ASSIGNOR TO ANNA M. SUITS, OF SAME PLACE.

PERCOLATOR.

SPECIFICATION forming part of Letters Patent No. 302,675, dated July 29, 1884.

Application filed November 28, 1883. (No model.)

*To all whom it may concern:*

Be it known that I, WALLACE SUITS, of Canastota, in the county of Madison, in the State of New York, have invented new and useful Improvements in Percolators, of which the following, taken in connection with the accompanying drawings, is a full, clear, and exact description.

This invention has reference to the class of percolators usually employed by druggists and chemists in the manufacture of tinctures and fluid extracts.

The invention consists in an improved construction and combination of the constituent parts of the percolator, whereby the same is rendered more convenient and effective in its operation, all as hereinafter more fully described, and specifically set forth in the claims.

The invention is fully illustrated in the annexed drawings, wherein Figure 1 shows the percolator in its operative position. Fig. 2 is a longitudinal section of the percolator, and Fig. 3 is a transverse section on line $xx$ in Fig. 2.

Similar letters of reference indicate corresponding parts.

A represents the case of the percolator or filter, consisting of a cylindrical shell having its two ends externally screw-threaded, and screw-caps C C' spanning said cylinder and removably connected to the ends thereof, so that the two ends of the case can be opened entirely to afford free access for cleaning the interior of the case when necessary. Each of said caps is provided in its center with a nipple, N, adapted for the attachment of a tube which communicates with the interior of the filtering-case by a duct extended through the nipple. The nipple of the lower cap, C', I prefer to construct of two parts, one of which is formed on the cap, and the other part screws onto the fixed part and has the inner end of its duct out of range with the duct of the stationary part, so that when the two parts are screwed tightly together communication between the ducts is prevented, thus making said nipple serve the function of a stop-cock.

I find the use of a stop-cock at the discharge end of the percolator very essential, inasmuch as it enables me to check at any time when deemed desirable the egress of the fluid from the filtering-case, and by the detention of said fluid produce maceration of the substance under pressure of the solvent, thereby promoting the action of the menstruum on said substance.

The drugs or substance from which the tincture or extract is to be obtained I support in the filtering-case A between two perforated diaphragms or disks, $a$ and $a'$, the disk $a$ being permanently fixed to the end of a rod, $r$, and the disk $a'$ having a central aperture through which the opposite end of the rod passes loosely to allow said disk to slide thereon. This latter end of the rod is screw-threaded and provided with a nut, $n$, by which to apply the desired pressure on the movable disk $a'$ to compress the drugs or substance held between the two disks.

Between the nut $n$ and disk $a'$ I interpose an elastic cushion or follower, F, preferably in the form of a piece of rubber tubing slipped onto the rod. This cushion serves to apply the pressure to the disk $a'$ gradually, and automatically compensate for the shrinkage of the substance under treatment.

I am aware that the two diaphragms or disks $a$ $a'$ have heretofore been adjustably connected by a rod having right and left screw-threads, respectively, on opposite ends working in screw-threaded eyes in said disks, and by various other means; but all of said prior construction and combination of parts require the rod to be turned in order to adjust the disks, and this movement of the rod disturbs the drugs adjacent thereto, and thereby forms a passage for the fluid along the side of the rod, whereas by my improvement the rod is stationary, and thus the drugs or substance under treatment are allowed to pack closely around it.

To prepare the percolator for operation, place the case A in an upright position, with the cap C at the bottom. Then insert into the case the rod $r$ with the stationary disk $a$ foremost. Then introduce the desired quantity of the substance from which the extract is to be obtained, slip the second disk, $a'$, onto the rod, place the elastic follower F over the disk $a'$, and apply the nut $n$ with sufficient force to produce the necessary pressure on the movable disk $a'$ to pack the substance between the two disks. In most cases it is desirable to place filtering-paper over the disks. Then close the case by applying the cap $C'$ and invert the percolator thus charged. This brings to the bottom of the percolator the cap $C'$, which is provided with a stop-cock. The alcohol or other suitable menstruum is introduced through the upper nipple, N, by means of a rubber tube or other suitable conduit extended to and communicating with a suitable reservoir, R, of the menstruum, said reservoir being situated in an elevated position and provided with a stop-cock, $d$, to control the flow of the menstruum. The solvent or menstruum entering the case percolates through the substance held between the two disks $a$ $a'$, and by opening the stop-cock on the lower end of the percolator the fluid issues from the case and is collected in a bottle or suitable receptacle connected with the lower nipple in any suitable manner, as illustrated in Fig. 1 of the drawings. When it is found that the issuing extract is too weak, the stop-cock on the lower end of the percolator can be closed, thereby causing the inflowing menstruum to exert a hydrostatic pressure on the substance under treatment and producing maceration of the same, and consequently promoting the action of the solvent.

Having described my invention, what I claim as new, and desire to secure by Letters Patent, is—

1. The improved filtering-case consisting of a cylindrical shell having screw-threaded ends, and screw-caps spanning the cylinder and removably connected to the ends thereof, and provided in their center with a nipple for the attachment of a tube or pipe, substantially as described and shown.

2. In combination with the case A, having caps C C', provided in their center with the nipple N, the diaphragm $a$, the rod $r$, permanently fixed at one end to said diaphragm and having its opposite end screw-threaded, the diaphragm $a'$, movably connected with said rod, and the nut $n$, applied to the rod under the movable diaphragm, the whole constructed and combined to maintain the rod stationary during the adjustment of the diaphragms, substantially as specified.

3. The combination, with the adjustable diaphragm or filtering-disk and its adjusting-nut, of an elastic follower interposed between the said parts, substantially as and for the purpose specified.

In testimony whereof I have hereunto signed my name and affixed my seal, in the presence of two attesting witnesses, at Syracuse, in the county of Onondaga, in the State of New York, this 17th day of November, 1883.

WALLACE SUITS. [L. S.]

Witnesses:
C. H. DUELL,
F. H. GIBBS.